UNITED STATES PATENT OFFICE.

ANN O. HAGSTEDT, OF NEW YORK, N. Y.

COMPOSITION FOR EXTERMINATING INSECTS.

SPECIFICATION forming part of Letters Patent No. 449,905, dated April 7, 1891.

Application filed July 31, 1890. Serial No. 360,558. (No specimens.)

*To all whom it may concern:*

Be it known that I, ANN O. HAGSTEDT, a citizen of Sweden, and a resident of New York city, in the county and State of New York, have invented new and useful Improvements in Compositions for Exterminating Insects, of which the following is a specification.

My invention consists in a composition of substances of which the base elements are tincture of benzoin, wormwood, woodruff, (*Asperula odorata*,) and preferably honey; but I may substitute sirup of glycerine or other substance of like viscous nature that will retain its moisture for a long time. With these substances I may also use cloves, and sometimes corrosive sublimate.

The proportions are about as follows; but they may be varied, of course, to some extent without departing from the spirit of my invention: one gallon tincture of benzoin, six pounds wormwood, six pounds woodruff, twenty gallons honey, one pound cloves when used, one pound corrosive sublimate when it is used.

The wormwood and woodruff, also cloves when used, are boiled in six quarts of water or thereabout for an hour or so and strained and mixed together with the benzoin and honey. When the corrosive sublimate is used, it is dissolved in hot water, muriatic acid, or alcohol, and mixed with the rest, as above.

Lavender or other perfume may be added to the mixture in any desired quantity for improving the odor; but I do not limit myself to the use of any such substance.

I claim as my invention—

1. The compound of tincture of benzoin, wormwood, woodruff, and honey, in about the proportions of one gallon of tincture of benzoin, six pounds of wormwood, six pounds of woodruff, and twenty gallons of honey, substantially as described.

2. The compound of tincture of benzoin, wormwood, woodruff, cloves, corrosive sublimate, and honey, in about the proportions of one gallon of tincture of benzoin, six pounds of wormwood, six pounds of woodruff, one pound of cloves, one pound of corrosive sublimate, and twenty gallons of honey, substantially as described.

In testimony that I claim the foregoing as my invention I have signed my name, in presence of two witnesses, this 21st day of July, 1890.

ANN O. HAGSTEDT.

Witnesses:
  W. J. MORGAN,
  WILFRED B. EARLL.